United States Patent
Rogne et al.

[11] Patent Number: 5,970,646
[45] Date of Patent: Oct. 26, 1999

[54] OUTHAUL DEVICE FOR FISHING LINES

[75] Inventors: Geir Rogne; Hilbert Johansen; Hansen Martin Jan, all of Gjøvik, Norway

[73] Assignee: O. Mustad & Son A/S, Gjovik, Norway

[21] Appl. No.: 09/000,461

[22] PCT Filed: Jun. 2, 1997

[86] PCT No.: PCT/NO97/00139

§ 371 Date: Feb. 3, 1998

§ 102(e) Date: Feb. 3, 1998

[87] PCT Pub. No.: WO97/46089

PCT Pub. Date: Dec. 11, 1997

[30]    Foreign Application Priority Data

Jun. 3, 1996 [NO] Norway ................................... 96 2290

[51] Int. Cl.$^6$ ................................................. A01K 91/00
[52] U.S. Cl. ....................................................... 43/27.4
[58] Field of Search ............................ 43/4, 4.5, 27.4

[56]           References Cited

U.S. PATENT DOCUMENTS

| | | | |
|---|---|---|---|
| 3,419,990 | 1/1969 | Lewis et al. | 43/27.4 |
| 4,068,399 | 1/1978 | Bjorshol . | |
| 4,205,479 | 6/1980 | Björshol | 43/44.86 |
| 4,266,359 | 5/1981 | Alex | 43/27.4 |
| 4,453,330 | 6/1984 | Jorgensen-Dahl . | |
| 4,567,684 | 2/1986 | Bjorshol | 43/27.4 |
| 4,858,362 | 8/1989 | Cook, Jr. | 43/27.4 |
| 4,908,972 | 3/1990 | Stamer et al. | 43/27.4 |
| 4,920,680 | 5/1990 | Lindgren | 43/7.4 |
| 5,165,174 | 11/1992 | Brown, Jr. | 43/27.4 |

FOREIGN PATENT DOCUMENTS

| | | |
|---|---|---|
| 4802/88 | 2/1990 | Germany . |
| 143045 | 11/1976 | Norway . |

*Primary Examiner*—Thomas Price
*Attorney, Agent, or Firm*—Jacobson, Price, Holman & Stern, PLLC

[57]          ABSTRACT

An outhaul device for fishing lines, mounted on a vessel and arranged to pull the line successively from a line store and deploy the line behind the vessel. The outhaul device includes at least one pair of wheels which can be rotated about their respective symmetry axes of rotation by respective drive devices, and between which the line can be caused to extend, as it is pressed against the wheels. The symmetry axes are lying in a common plane. Each of the wheels may be tilted about an axis which is lying in the common plane and extends perpendicular to the symmetry axis of the wheel. Also each of the wheels is adapted to be tilted about an axis which is perpendicular to the common plane.

16 Claims, 1 Drawing Sheet

OUTHAUL DEVICE FOR FISHING LINES

The invention relates to an outhaul device for fishing lines as specified in the introduction to claim 1.

An outhaul device of this type is known in the prior art, where the line extends between a number of wheels which are arranged in succession in the line-hauling direction and displaced in relation to one another across it, with the result that the line extends in an S-shape between the wheels. Thus even a wet monofilament line can be pulled out from a line store without any risk of the line sliding on the wheels. This outhaul device, however, is only arranged to haul a line without snells, since the snells have to be attached to securing devices on the line on the downstream side of the outhaul device, considered in the hauling direction. The reason for this is that the S-shaped line path through the outhaul device may easily cause the line and the snells to become tangled, with any bait being flung off the hooks due to the rapid change in speed, i.e. change in direction. Moreover, the wheels are not designed to yield to the snells' securing devices when they are passed between the wheels.

The snells are thereby attached to the line via the securing devices on the downstream side of the outhaul device, a task which at present is performed manually, and which is acceptable only if the number of snells is small, e.g. in tuna fishing, if there is a substantial distance between the snells and the weather is good. It would be inconceivable, however, to use an outhaul device of this kind in modern line fishing where each line may have, e.g., 40,000 snells.

The object of the invention is to provide an outhaul device of the type mentioned in the introduction which is not encumbered by the abovementioned disadvantages.

The characteristics of the outhaul device according to the invention are presented in the characteristic features indicated in the claims.

The invention will now be described in more detail with reference to the drawing which schematically illustrates an embodiment of an outhaul device according to the invention.

The terms up and down should be understood to indicate directions towards the edge of the page which faces away from and towards the reader respectively.

Figure 1:
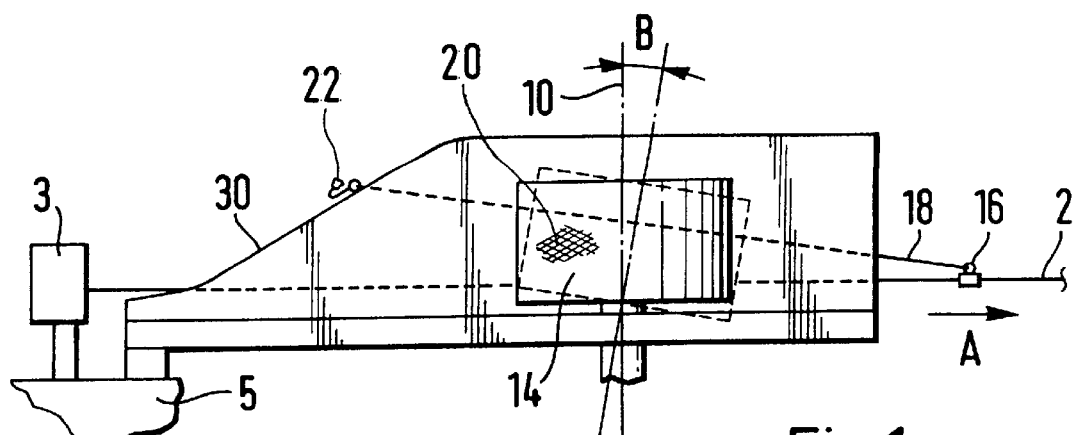
FIG. 1 is a side view of an outhaul device.
Figure 2:
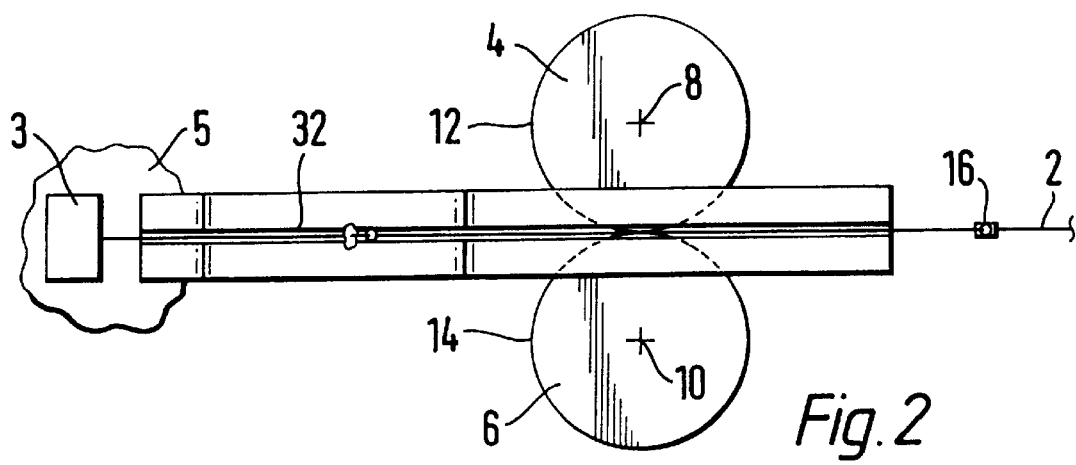
FIG. 2 is a plan view of the outhaul device illustrated in FIG. 1.

As illustrated in FIGS. 1 and 2 a fishing line 2 extends rectilinearly between a pair of wheels 4,6 from a line store 3, via a spool device, at the left side of the page towards the right as indicated by the arrow A, the line store 3 being attached to the hull of a vessel 5 of which only a part is shown. The wheels 4,6 can be rotated about their symmetry axes of rotation 8 and 10 respectively by means of a suitable drive device, e.g. hydraulic motors (not shown), both wheels preferably being driven. The symmetry axes extend in a common plane which extends substantially perpendicularly to the line hauling direction. The wheels' contact surfaces 12, 14 abut against each other, thus pressing the line against the respective contact surfaces. One contact surface, e.g. contact surface 12, can be made of an elastically yielding material, e.g. rubber, thus enabling the securing devices 16 whereby snells 18 are attached to the line 2 to be received by this contact surface and pass the wheels during line hauling. The second wheel's contact surface is preferably provided with a pattern such as a serration 20 in order to ensure a good connection between the wheel and the line.

In order to prevent the fishing hooks 22 on the snells which have been supplied with bait from being squeezed between the wheels and the bait destroyed, at the wheels there is provided a ramp 30 which extends from a point in front of the wheels 12,14, considered in the line hauling direction, to a point above the wheels. From this point the ramp extends past the wheels to a point on the downstream side thereof.

The ramp 30 has a groove 32 through which the line 2 extends, and which is so wide that the securing devices 16 can also be passed through the groove. The width of the groove, however, is so small that the hooks with bait attached cannot pass through the groove.

Thus when the line 2 is hauled, the line will be able to pass rectilinearly from a point on the upstream side of the outhaul device, between the wheels 4,6 of the outhaul device to a point on the downstream side of the outhaul device, drawing the snells along with it. When a fishing hook on a snell reaches the ramp, however, it will be displaced upwards along it, since it or the bait rests on the groove's lateral edge sections, above and past the wheels 4,6, and fall freely down from the ramp behind them and out into the water.

By guiding the line linearly between the wheels 4,6 and the arrangement of the ramp 30, it becomes possible for the snells 18 to be connected to the line and baited on the upstream side of the outhaul device, thus permitting an automatic connection of the snells 18 with the line and automatic baiting of the snells' fishing hooks.

In order to ensure that the wheels 4,6 are pressed with sufficient force against each other, providing a sufficient amount of friction between the line and the contact surfaces 12,14, pressing devices such as hydraulic jacks 34,36 can be employed which influence the respective wheels; e.g. via rollers which abut against the contact surfaces, these jacks being attached to stationary parts (not shown) of the outhaul device.

As illustrated in FIG. 1, the wheels 4,6 can be tilted in a plane which includes the respective wheels' axes of rotation and are perpendicular to the common plane for the wheels' axes of rotation, as indicated by the angle B, thus preventing the line from being dislocated, i.e. being moved up and out of engagement with the wheels.

Figure 3:
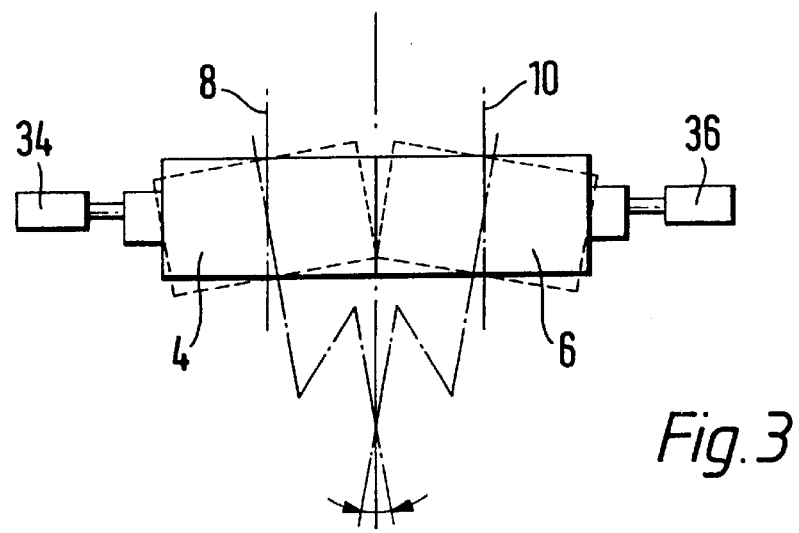
FIG. 3 is a front view of only the two wheels of the outhaul device.

Furthermore, the wheels can be arranged for tilting in the common plane for the wheels' axes of rotation as illustrated in FIG. 3. The lower sections of the contact surfaces 12,14 are thereby pressed very hard against each other, thus achieving a particularly strong pressing of these contact surface sections against the line. A further achievement is that other contact surface sections do not come into contact with one another, thus reducing the wheels' rolling resistance and the power which is required for driving the wheels.

If the wheels' drive devices are controlled by a programmable logic control device (not shown) and suitable sensors (not shown) which are connected thereto, the wheels may be stopped automatically if the line and the snells become tangled and the tractive power in the line 2 during hauling exceeds a predetermined value. Moreover, an automatic regulation of the wheels' rotational speed can be achieved, thus enabling the speed at which the line is deployed in the water to be adapted to the speed of the vessel.

We claim:

1. An outhaul device for fishing lines, arranged to pull the line successively from a line store on a vessel on which the outhaul device is mounted and deploy the line behind the vessel, said outhaul device comprising at least one pair of wheels which by drive devices can be rotated about their respective symmetry axes of rotation for pulling the line, and between which the line and securing devices whereby snells are attached to the line, can be caused to extend, as it is pressed against the wheels, and a bypass device with which hooks and adjacent parts of the snells may be guided successively past the wheels, where the wheels' symmetry axes lie in a common plane which extends substantially perpendicular to a hauling direction, and each of the wheels being tiltable about an axis which is lying in the common plane and extends perpendicular to the symmetry axis of the wheels.

2. An outhaul device according to claim 1, wherein a control device is arranged to effect a regulation of the wheels' rotational speed depending on the vessel's speed.

3. An outhaul device according to claim 2, wherein the control device is arranged to effect an automatic stoppage of the wheels' drive device when the hauling force in the line exceeds a specific value.

4. An outhaul device according to claim 2 wherein the control device is a programmable, logic control device.

5. An outhaul device according to claim 1, wherein at least one of the wheels has a contact surface which is arranged to yieldingly receive the securing devices.

6. An outhaul device according to claim 5, wherein the contact surface of at least one of the wheels is serrated.

7. An outhaul device according to claim 1, wherein hydraulic devices are arranged to press the wheels against each other.

8. An outhaul device according to claim 1, wherein the wheels' drive devices comprise one of hydraulic, pneumatic and electric motors.

9. An outhaul device for fishing lines, arranged to pull the line successively from a line store on a vessel on which the outhaul device is mounted and deploy the line behind the vessel, said outhaul device comprising at least one pair of wheels which by drive devices can be rotated about their respective symmetry axes of rotation for pulling the line, and between which the line and securing devices whereby snells are attached to the line, can be caused to extend, as it is pressed against the wheels, and a bypass device with which hooks and possibly adjacent parts of the snells may be guided successively past the wheels, where the wheels' symmetry axes lie in a common plane which extends substantially perpendicular to the hauling direction, and each of the wheels being tiltable about an axis which is perpendicular to the common plane.

10. An outhaul device according to claim 9, wherein a control device is arranged to effect a regulation of the wheels' rotational speed depending on the vessel's speed.

11. An outhaul device according to claim 10, wherein the control device is arranged to effect an automatic stoppage of the wheels' drive device when the hauling force in the line exceeds a specific value.

12. An outhaul device according to claim 10, wherein the control device is a programmable, logic control device.

13. An outhaul device according to claim 9, wherein at least one of the wheels has a contact surface which is arranged to yieldingly receive the securing devices.

14. An outhaul device according to claim 13, wherein the contact surface of at least one of the wheels is serrated.

15. An outhaul device according to claim 9, wherein hydraulic devices are arranged to press the wheels against each other.

16. An outhaul device according to claim 9, wherein the wheels' drive devices comprise one of hydraulic, pneumatic and electric motors.

* * * * *